US009860393B2

(12) United States Patent
Kato

(10) Patent No.: US 9,860,393 B2
(45) Date of Patent: Jan. 2, 2018

(54) VIRTUAL COMPUTER SYSTEM, NON-TRANSITORY COMPUTER READABLE MEDIUM, AND METHOD FOR VIRTUAL COMPUTER SYSTEM

(71) Applicant: FUJI XEROX CO., LTD., Tokyo (JP)

(72) Inventor: Hideo Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/061,217

(22) Filed: Mar. 4, 2016

(65) Prior Publication Data

US 2017/0064094 A1    Mar. 2, 2017

(30) Foreign Application Priority Data

Aug. 27, 2015  (JP) .................................. 2015-168054

(51) Int. Cl.
| | |
|---|---|
| H04N 1/00 | (2006.01) |
| G06F 3/12 | (2006.01) |
| G06F 11/00 | (2006.01) |
| G06F 11/07 | (2006.01) |
| G06F 11/14 | (2006.01) |
| H04N 1/21 | (2006.01) |

(52) U.S. Cl.
CPC ....... *H04N 1/00037* (2013.01); *G06F 3/1229* (2013.01); *G06F 11/008* (2013.01); *G06F 11/079* (2013.01); *G06F 11/0733* (2013.01); *G06F 11/14* (2013.01); *H04N 1/00* (2013.01); *H04N 1/00005* (2013.01); *H04N 1/00082* (2013.01); *H04N 1/2104* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2006/0015316 A1* | 1/2006 | Siahaan | .............. | G06F 9/45537 703/27 |
| 2012/0229852 A1* | 9/2012 | Kubo | ................. | G06K 15/1817 358/1.15 |
| 2013/0111275 A1* | 5/2013 | Ganesan | ............. | G06F 11/0748 714/49 |

(Continued)

FOREIGN PATENT DOCUMENTS

| | | |
|---|---|---|
| JP | 2014-032498 A | 2/2014 |
| JP | 5713138 B1 | 5/2015 |

*Primary Examiner* — Fan Zhang
(74) *Attorney, Agent, or Firm* — Oliff PLC

(57) ABSTRACT

A virtual computer system includes a potential failure-causing event detection controller, a saving unit, and a snapshot creation unit. The potential failure-causing event detection controller detects a potential failure-causing event relating to a printer provided external to a virtual computer having installed thereon a guest operating system on which an application program is installed or relating to control of the printer. The saving unit performs a saving process of saving information indicating the potential failure-causing event and information about a page for which printing is not completed by the printer. The snapshot creation unit creates a snapshot of the guest operating system including the application program after the saving unit has performed the saving process.

13 Claims, 14 Drawing Sheets

(56) References Cited

U.S. PATENT DOCUMENTS

2014/0245266 A1\* 8/2014 Sun .................... G06F 11/3688
717/124
2014/0281714 A1\* 9/2014 Matthews ........... G06F 11/2294
714/27

\* cited by examiner

FIG. 4

| ID | INTRA-CONTROLLER POTENTIAL FAILURE-CAUSING EVENT |
|---|---|
| A1 | NO SHEET AVAILABLE FOR JOB |
| A2 | IMAGING ERROR |
| A3 | POST-PROCESSING INSTRUCTION BASED ON PROHIBITED COMBINATION |
| A4 | SHEET SIZE OF JOB DIFFERENT FROM OUTPUT TRAY SIZE |
| A5 | VIOLATION OF I/F RULE BETWEEN PRINT CONTROLLERS |
| A6 | PRINTING SUSPENDED AT SPECIFIED PAGE (FUNCTION OF PRINT CONTROLLER) |
| ⋮ | ⋮ |

REPRODUCTION OF POTENTIAL FAILURE-CAUSING EVENT IS POSSIBLE ONLY BY RESTORING SNAPSHOT

| ID | OPERATOR-REPRODUCIBLE POTENTIAL FAILURE-CAUSING EVENT |
|---|---|
| B1 | OUT OF PAPER |
| B2 | OUT OF TONER (REPLACED WITH EMPTY TONER BOX) |
| B3 | STACKER UNLOADED |
| B4 | PRINT CONTROLLER RESTARTED |
| B5 | PRINTER POWER TURNED OFF/ON |
| B6 | RETURN FROM POWER SAVING MODE |
| B7 | PRINTING SUSPENDED |
| ⋮ | ⋮ |

REPRODUCTION OF POTENTIAL FAILURE-CAUSING EVENT IS REQUESTED TO OPERATOR — 550

FIG. 6

| ID | OPERATOR-IRREPRODUCIBLE POTENTIAL FAILURE-CAUSING EVENT |
|---|---|
| C1 | JAM |
| C2 | MISFEED |
| C3 | STACKER FULL |
| C4 | ABNORMAL FUSER TEMPERATURE |
| C5 | ERROR IN DRUM MOTOR |
| C6 | ERROR IN POWER |
| ⋮ | ⋮ |

INSTRUCTION IS GIVEN TO PRINTER SIMULATOR TO REPRODUCE POTENTIAL FAILURE-CAUSING EVENT

VIRTUAL COMPUTER SYSTEM, NON-TRANSITORY COMPUTER READABLE MEDIUM, AND METHOD FOR VIRTUAL COMPUTER SYSTEM

CROSS-REFERENCE TO RELATED APPLICATIONS

This application is based on and claims priority under 35 USC 119 from Japanese Patent Application No. 2015-168054 filed Aug. 27, 2015.

BACKGROUND

Technical Field

The present invention relates to a virtual computer system, a non-transitory computer readable medium, and a method for a virtual computer system.

SUMMARY

According to an aspect of the invention, there is provided a virtual computer system including a potential failure-causing event detection controller, a saving unit, and a snapshot creation unit. The potential failure-causing event detection controller detects a potential failure-causing event relating to a printer provided external to a virtual computer having installed thereon a guest operating system on which an application program is installed or relating to control of the printer. The saving unit performs a saving process of saving information indicating the potential failure-causing event and information about a page for which printing is not completed by the printer. The snapshot creation unit creates a snapshot of the guest operating system including the application program after the saving unit has performed the saving process.

BRIEF DESCRIPTION OF THE DRAWINGS

An exemplary embodiment of the present invention will be described in detail based on the following figures, wherein:

FIG. 4 is an explanatory diagram illustrating an example data structure of an intra-controller potential failure-causing event table;

FIG. 6 is an explanatory diagram illustrating an example data structure of an irreproducible potential failure-causing event table;

DETAILED DESCRIPTION

First, before a description of an exemplary embodiment is given, techniques that serve as the bases of this exemplary embodiment are described with reference to the examples illustrated in FIGS. 2 and 3. The description of the techniques is given for the purpose of facilitating understanding of this exemplary embodiment. The description is given while assuming a printer to be an external apparatus, for example.

Figure 2:
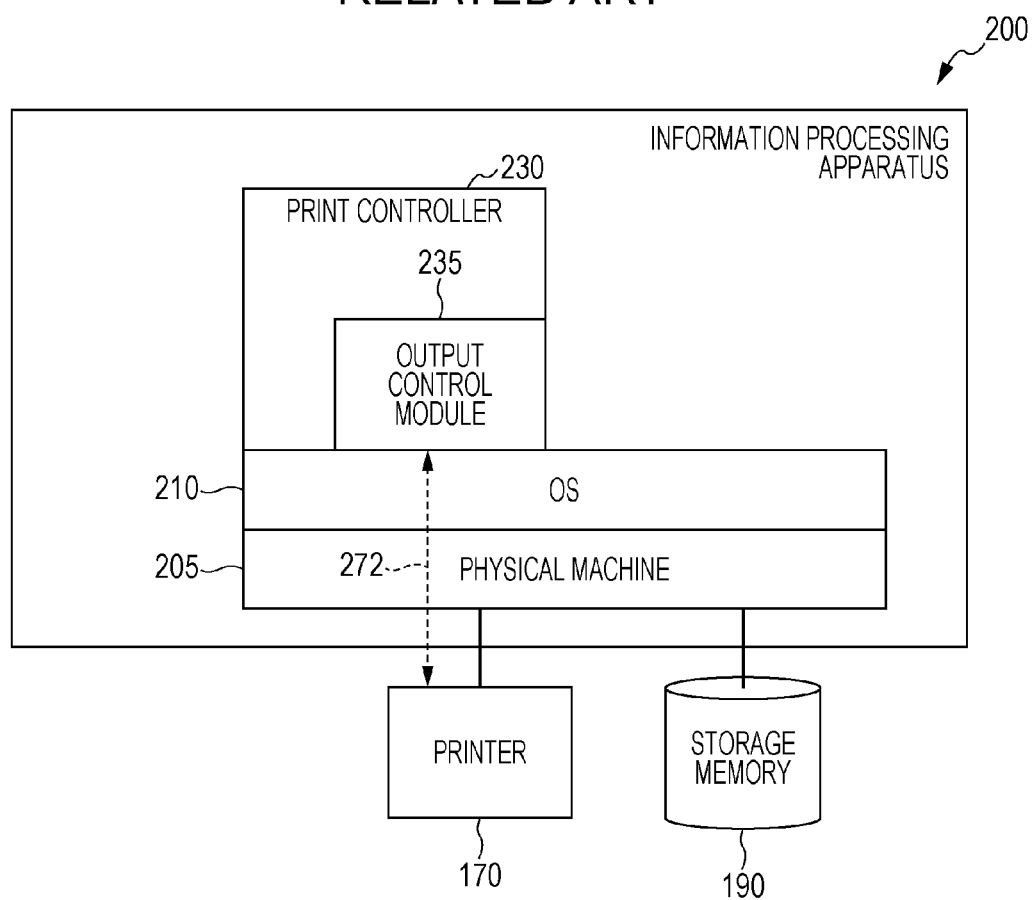
FIG. 2 is an explanatory diagram illustrating an example system configuration according to the related art.
Figure 3:
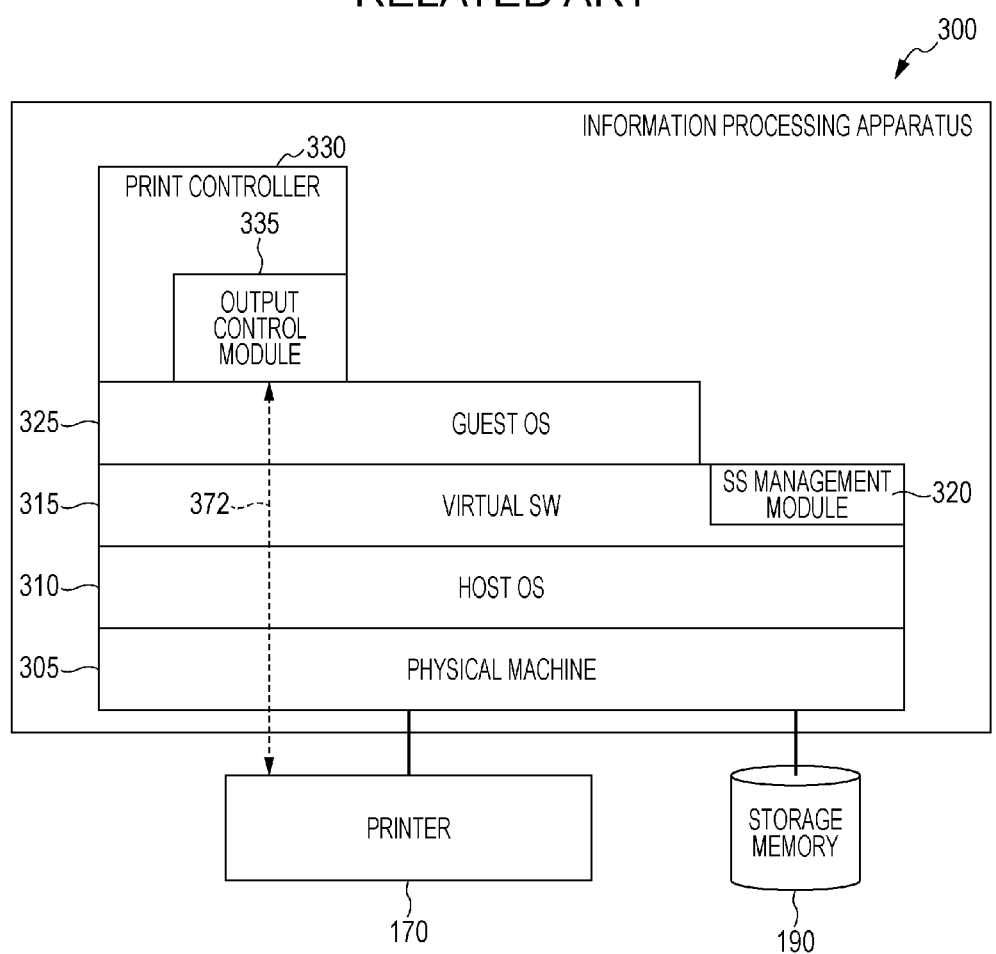
FIG. 3 is an explanatory diagram illustrating an example system configuration according to the related art.

FIG. 2 is an explanatory diagram illustrating an example of the related art. An information processing apparatus 200 controls a printer 170, which is an external apparatus, to make the printer 170 perform print processing. The information processing apparatus 200 is not a virtual computer system but a general computer (a computer constituted by one physical machine 205 and one operating system (OS) 210). The information processing apparatus 200 functions as a printer server or a printer controller, and the printer 170 is a high-speed printer, for example.

The information processing apparatus 200 includes the physical machine 205 and the OS 210 in this order from the lowest layer and further includes a print controller 230, which is an application program, on the OS 210. The print controller 230 includes an output control module 235. The output control module 235 is a module that controls the printer 170.

When a failure occurs in the information processing apparatus 200 or the printer 170, log information about the inside of the print controller 230 and the OS 210 is collected in accordance with an instruction given by the output control module 235. The occurred failure may be caused by the printer 170, and therefore, the output control module 235 also collects log information about the printer 170. The output control module 235 thereafter stores the log information about the inside of the print controller 230 and the OS 210 and the log information about the printer 170 in a storage memory 190.

The information processing apparatus 200 performs an operation for making the printer 170 perform print processing. It is assumed that a failure occurs during the operation. As described above, the output control module 235 stores log information about the inside of the print controller 230 and the OS 210 and log information about the printer 170 in the storage memory 190.

Thereafter, recovery processing for the failure is performed and the operation resumes.

Subsequently, after the end of the operation of the printer 170, the log information about the inside of the print controller 230 and the OS 210 and the log information about the printer 170 stored in the storage memory 190 are analyzed to thereby examine the cause of and measures against the failure, for example. The recovery processing is performed and the operation is resumed after the logs have been collected without analyzing the logs in order to allow the printer 170 to continue performing print processing. Specifically, in a case where the printer 170 is a high-speed printer, it is requested to reduce the downtime (a period during which printing is not possible).

Next, an example of a virtual computer system is described. FIG. 3 is an explanatory diagram illustrating an example of the related art. An information processing apparatus 300 is a virtual computer system and controls the printer 170, which is an external apparatus, to make the printer 170 perform print processing. The information processing apparatus 300 functions as a printer server, and the printer 170 is a high-speed printer, for example.

A technique called a virtual system is a technique in which plural guest OSs 325 run on one physical machine 305 (hardware). As illustrated in the example in FIG. 3, virtual hardware constituted by a host OS 310 and virtual software (SW) 315 is configured on the physical machine 305, the guest OS 325 is installed on the virtual hardware, and further, a print controller 330, which is an application program (application), is installed on the guest OS 325.

The virtual SW 315 is software that allows the plural guest OSs 325 to be co-resident in parallel with one another. That is, the virtual SW 315 is used to configure hardware units, such as a central processing unit (CPU), a memory, and a hard disk drive (HDD), as software to thereby provide hardware resources on which the guest OSs 325 depend, as virtual machines.

An output control module 335 is a digital front-end (DFE), for example. In this case, the virtual machines are isolated from one another and, even if a failure (a crash, for example) occurs in one of the virtual machines, the output control module 335 continues operating on the remaining virtual machines. Therefore, it is possible to perform printing.

Specifically, the information processing apparatus 300 includes the physical machine 305, the host OS 310, the virtual SW 315, and the guest OS 325 in this order from the lowest layer and further includes the print controller 330, which is an application program, on the guest OS 325. The virtual SW 315 includes a snapshot (SS) management module 320, and the print controller 330 includes the output control module 335. The storage memory 190 stores a snapshot created by the SS management module 320. In the example in FIG. 3, one guest OS 325 is configured on the virtual SW 315; however, the information processing apparatus 300 is a virtual computer system, and therefore, the plural guest OSs 325 may be configured on the virtual SW 315.

In the information processing apparatus 300, the print controller 330, which is an application program, operates in a virtual environment, and a snapshot function (which is a function of the SS management module 320) in the virtual environment is used to retain in the storage memory 190 the failure state at the time when a failure occurred as a snapshot. After a recovery from the failure and a specific print process are completed (at a time when a print operation is not performed), the state at the time when the failure occurred is reproduced by using the snapshot saved in the storage memory 190, and failure information is collected. Here, a snapshot of the guest OS 325 on which the print controller 330 operates is created and reproduced by the SS management module 320.

The information processing apparatus 300 performs an operation for making the printer 170 perform print processing. It is assumed that a failure occurs during the operation.

When the occurrence of the failure is detected, the host OS 310 instructs the SS management module 320 to take a snapshot. The SS management module 320 stores state A, which represents the state of the guest OS 325 and that of the print controller 330 at the time of the failure, in the storage memory 190 as a snapshot. Log information is generated by the printer 170 upon the occurrence of the failure. However, the snapshot is taken by the SS management module 320 in order to obtain the internal state of the information processing apparatus 300, and therefore, the log information generated by the printer 170, which is an external apparatus, is not a snapshot target.

Thereafter, recovery processing for the failure is performed and the operation resumes.

When the host OS 310 gives a snapshot reproduction instruction to the SS management module 320 after the end of the operation of the printer 170, the SS management module 320 reads the snapshot saved in the storage memory 190 and restores the state of the guest OS 325 and that of the print controller 330 to state A. Thereafter, the host OS 310 gives a failure information collection instruction to the output control module 335. The output control module 335 gives a log collection instruction to the print controller 330 and obtains the state of the inside of the print controller 330 and that of the guest OS 325 at the time of the failure as log information. The output control module 335 gives a log collection instruction to the printer 170 and obtains log information about the state at the time of the failure from the printer 170. The output control module 335 stores the obtained information in the storage memory 190 as log information at the time of the failure.

Regarding log information collected from the printer 170, if a print process is performed (the operation is resumed) at a time point between the time when a failure occurs and the time when a failure information collection instruction is given, log information from the printer 170 which is obtained in response to the failure information collection instruction includes information about the print process performed after the failure (the print process performed after the resumption of the operation), which is different from log information from the printer 170 generated at the time when the failure occurred. Therefore, a situation may arise in which the log information from the printer 170 generated at the time when the failure occurred has been lost (overwritten) due to the print process performed after the operation of the printer 170 has been resumed. That is, the log information from the printer 170 generated at the time when the failure occurred might not be stored in the storage memory 190 in response to a failure information collection instruction.

In a case of a failure for which it takes some time for a problem to surface, a snapshot obtained immediately after the occurrence of the problem might not include information about the cause or the like.

For example, even if a memory is rewritten in a certain unauthorized process, no problem occurs as long as the corresponding area is not used. In a case where the time from when the memory is rewritten in the unauthorized process until when a problem surfaces as a failure is long, even if a snapshot is taken at the time when the failure occurs, the log is overwritten, and therefore, information about the unauthorized rewriting might not remain saved.

Taking a snapshot is a technique that enables restoration of any state of the print controller; however, the state of the printer (information about a sheet that is being printed, the status of the printer, a fault, and so on) is not saved, and therefore, it is not possible to restore the state of the printer.

Accordingly, it is not possible to reproduce a failure (specifically, a failure in the output control module) by using a snapshot.

Hereinafter, an example of one exemplary embodiment of the present invention will be described with reference to the drawings.

Figure 1:
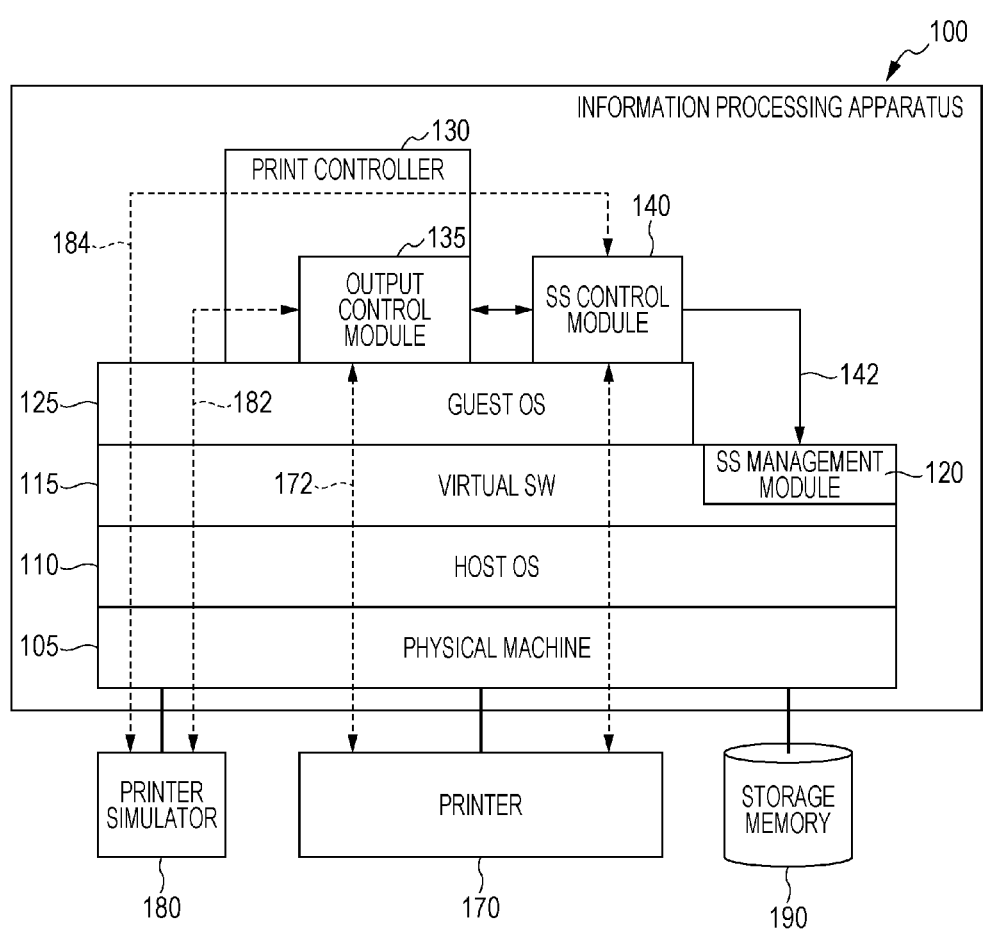
FIG. 1 is a diagram schematically illustrating a module structure of an example configuration according to an exemplary embodiment.

FIG. 1 is a diagram schematically illustrating a module structure of an example configuration according to this exemplary embodiment.

Note that a module generally refers to a software component (computer program), a hardware component, or the like that is logically isolatable. Therefore, modules described in this exemplary embodiment refer to not only modules in a computer program but also modules in a hardware configuration. Accordingly, a description in this exemplary embodiment is given also for describing a computer program for causing a computer to function as the modules (a program for causing a computer to perform procedures of the modules, a program for causing a computer to function as the units of the modules, or a program for causing a computer to implement functions of the modules), a system, and a method. Although the term "store" and a similar term are used for convenience of description, these terms mean to store something on a storage device or to perform control to store something on a storage device in a case where an exemplary embodiment relates to a computer program. Although one module may correspond to one function, one module may be configured by using one program, or plural modules may be configured by using one program in implementation. Alternatively, one module may be configured by using plural programs. Plural modules may be executed by one computer, or one module may be executed by plural computers that are in a distributed or parallel environment. One module may include another module. The term "connection" described below is used in a case of a physical connection and also in a case of a logical connection (such as an exchange of data, an instruction, a reference relation between pieces of data, and so on). The term "predetermined" means that something is determined prior to a target process and is used to mean that something is determined before a process according to this exemplary embodiment starts, as a matter of course, or before a target process starts even after a process according to this exemplary embodiment has started, in accordance with the situation or condition at the time or the situation or condition up to the time. In a case where plural "predetermined values" are present, the values may differ from one another, or two or more of the values (or all values, as a matter of course) may be the same. A description having a meaning of "if A, then B is performed" is used to mean that "it is determined whether A or not and, if it is determined to be A, B is performed", except for a case where determination as to whether A or not is not necessary.

The term "system or apparatus" corresponds to a configuration in which plural computers, hardware units, apparatuses, or the like are connected to one another via a communication system, such as a network (including one-to-one communication connections), and also corresponds to a case where an exemplary embodiment is implemented by using one computer, one hardware unit, one apparatus, or the like. The term "apparatus" may be used as a synonym for the term "system". The term "system" does not mean a mere social "mechanism" (social system), which is an artificial arrangement.

Target information is read from a storage device each time a process is performed by each module or, in a case where plural processes are performed by a module, each time each process is performed, and a processing result is written to the storage device after the process has been performed. Accordingly, a description of reading from a storage device before a process and writing to the storage device after the process may be omitted. A storage device mentioned here may include a hard disk, a random access memory (RAM), an external storage medium, a storage device connected via a communication line, a register in a CPU, and so on.

An information processing apparatus 100, which is a virtual computer system according to this exemplary embodiment, enables reproduction of an event that may cause a failure (a potential failure-causing event), and enables reproduction of or reproduces the state at the time when the potential failure-causing event occurs as well as information about a page for which printing is not completed by the printer 170. As illustrated in the example in FIG. 1, the information processing apparatus 100 includes a physical machine 105, a host OS 110, virtual SW 115, and a guest OS 125 in this order from the lowest layer and further includes a print controller 130 and an SS control module 140, which are application programs, on the guest OS 125. The virtual SW 115 includes an SS management module 120. That is, the SS management module 120 is a module built in the virtual SW 115 by default. The print controller 130 includes an output control module 135.

The printer 170 is an apparatus external to the information processing apparatus 100 and performs print processing in accordance with control performed by the print controller 130 (including the output control module 135).

The storage memory 190 is an apparatus external to the information processing apparatus 100 and stores information indicating a potential failure-causing event, information about a print page (specifically, information about a page for which printing is not completed at the time point when a potential failure-causing event occurs), a snapshot, and so on.

A printer simulator 180 is not directly used in print processing. Therefore, the information processing apparatus 100 need not be equipped with the printer simulator 180 in a case of print processing. The information processing apparatus 100 is equipped with the printer simulator 180 typically in a case where the information processing apparatus 100 is used to examine, when a failure occurs, the cause of and measures against the failure. At this time, the printer simulator 180 simulates the functions of the printer 170. The printer simulator 180 is mainly configured as software, such as a program; however, the printer simulator 180 may partially include hardware.

Now, a description of functions of the output control module 135 and so on which are executed in a case of controlling the printer 170 and performing print processing is given. Specifically, the description relates to the print controller 130 that operates on the guest OS 125 in a virtual environment.

The output control module 135 controls the printer 170 that is provided external to the information processing apparatus 100. The information processing apparatus 100 is a virtual computer having installed thereon the guest OS 125 on which the print controller 130 (including the output control module 135), which is an application program, is installed. The output control module 135 detects an event that may cause a failure in the printer 170 or a failure that relates to control of the printer 170. A failure in the printer 170 is a failure that occurs in the printer 170. A failure that relates to control of the printer 170 is a failure that occurs in the information processing apparatus 100 controlling the printer 170 and mainly is a failure that occurs in the print controller 130.

The output control module 135 may detect a potential failure-causing event relating to the inside of the output control module 135 that controls the printer 170, a potential failure-causing event reproducible by an operator, or a potential failure-causing event irreproducible by an operator.

The SS control module 140 saves in the storage memory 190 information indicating a potential failure-causing event and information about a page for which printing is not completed by the printer 170.

The SS control module 140 controls the SS management module 120 to create a snapshot of the guest OS 125 including the print controller 130 after the SS control module 140 has performed a process.

Next, a description is given of functions of the output control module 135 and so on in a case of examining, after a failure has occurred, the cause of and measures against the failure and so on.

The output control module 135 accepts information saved by the SS control module 140 and a snapshot created by the SS management module 120.

In a case where an instruction for reproducing a failure is given to the information processing apparatus 100, which is externally equipped with the printer 170 and which is a virtual computer having installed thereon the guest OS 125 on which the print controller 130 (including the output control module 135), which is an application program, is installed, the SS control module 140 performs a different reproduction process depending on whether the potential failure-causing event is a potential failure-causing event relating to the inside of the output control module 135 that controls the printer 170, a potential failure-causing event reproducible by an operator, or a potential failure-causing event irreproducible by an operator.

The SS control module 140 controls the SS management module 120 to restore the snapshot.

In a case where information indicating a potential failure-causing event is information about a failure relating to the inside of the output control module 135 that controls the printer 170, the SS control module 140 may make the SS management module 120 perform a process (a restoration process using the snapshot).

In a case where information indicating a potential failure-causing event is information about a failure reproducible by an operator, the SS control module 140 may show a message for requesting an operator to perform reproduction and may make the SS management module 120 perform a process (a restoration process using the snapshot) after receiving an instruction indicating completion of reproduction from the operator.

In a case where information indicating a potential failure-causing event is information about a failure irreproducible by an operator, the SS control module 140 may instruct the printer simulator 180 to reproduce the potential failure-causing event in the printer 170 and may make the SS management module 120 perform a process (a restoration process using the snapshot).

A process to be performed is outlined.

The output control module 135 creates, for each sheet, a sheet information entry, in which print attribute information (a paper feed destination, an output destination, double-sided or single-sided printing, and so on) is stored, and gives a print instruction (performs message transmission/reception 172) for each sheet to the printer 170 on the basis of the sheet information entry.

When an event that may cause a failure occurs, the output control module 135 sends via the SS control module 140 an instruction to the SS management module 120 to create a snapshot, and stores a sheet information entry for a sheet that has not been output and potential failure-causing event information in the storage memory 190.

The information processing apparatus 100 restores the state at the time when the event that may cause a failure occurred by using the snapshot, the sheet information entry, and the potential failure-causing event information.

The information processing apparatus 100 automatically selects a method for reproducing the potential failure-causing event in accordance with the type of potential failure-causing event.

That is, the information processing apparatus 100 obtains a snapshot at the time when an event that may cause a failure occurs instead of the time when a failure occurs, and records the sheet information entry and potential failure-causing event information in the output control module 135. The failure is reproduced by another information processing apparatus 100 or by the information processing apparatus 100 on which operation has ended, thereby attempting to resolve the failure. A potential failure-causing event mentioned here is an event that is determined to be likely to cause a failure on the basis of past records and so on. Accordingly, a potential failure-causing event does not necessarily cause a failure. Potential failure-causing events that are targeted may be selected by comparing the time from when a potential failure-causing event occurs until when a failure actually occurs, the number of processes to be performed, and the processing load with predetermined thresholds respectively. As the time, the number of processes, and the processing load that are compared, statistical values of the past records (the means, medians, modes, maximum values, minimum values, and so on) may be used.

Specifically, in the comparison process, if the time, the number of processes, and the processing load are respectively equal to or larger than the predetermined thresholds, the potential failure-causing event may be selected as a target of this exemplary embodiment, for example. Alternatively, if at least one of the time, the number of processes, and the processing load satisfies the condition, the potential failure-causing event may be selected as a target potential failure-causing event.

It is not possible to reproduce some potential failure-causing events only by the print controller 130 depending on the types of potential failure-causing events, and therefore, a method of reproducing a potential failure-causing event by an operator operation or a method of reproducing a potential failure-causing event by using the printer simulator 180 is selected depending on the type of potential failure-causing event (see FIGS. 4 to 6 described below).

Examples of potential failure-causing events that are detected and data structures for the events are described with reference to FIGS. 4 to 6.

FIG. 4 is an explanatory diagram illustrating an example data structure of an intra-controller potential failure-causing event table 400.

The intra-controller potential failure-causing event table 400 has an identification (ID) field 410 and an intra-controller potential failure-causing event field 420. The ID field 410 stores therein information (potential failure-causing event ID) for uniquely identifying a potential failure-causing event. The intra-controller potential failure-causing event field 420 stores therein a potential failure-causing event that occurs inside the print controller 130.

In the intra-controller potential failure-causing event table 400, the values listed below are set, for example:

A1, which indicates that no sheet is available for a job;

A2, which indicates an imaging error (for example, it is not possible to generate an image for printing, an image generation error occurs, and so on);

A3, which indicates a post-processing instruction based on a prohibited combination (for example, a combination process of punching processing and stapling processing on the same position, for example);

A4, which indicates that the sheet size of a job is different from the output tray size (for example, an A5 sheet is specified but no A5 sheet is loaded on the tray);

A5, which indicates a violation of the interface rule between print controllers; and A6, which indicates that printing is suspended at a specified page (which is a function of the print controller 130).

In a case where any of these potential failure-causing events is detected, a corresponding one of the potential failure-causing event IDs is saved.

In the restoration process, if the potential failure-causing event ID is included in the intra-controller potential failure-causing event table 400, information indicating that "reproduction of the potential failure-causing event is possible only by restoring the snapshot" is obtained as restoration method information 450. Therefore, in this case, the SS control module 140 gives a snapshot obtaining and restoration instruction 142 to the SS management module 120 and restores the state at the time when the potential failure-causing event occurred.

Figure 5:
FIG. 5 is an explanatory diagram illustrating an example data structure of a reproducible potential failure-causing event table.

FIG. 5 is an explanatory diagram illustrating an example data structure of a reproducible potential failure-causing event table 500.

The reproducible potential failure-causing event table 500 has an ID field 510 and an operator-reproducible potential failure-causing event field 520. The ID field 510 stores therein a potential failure-causing event ID. The operator-reproducible potential failure-causing event field 520 stores therein a potential failure-causing event that is reproducible by an operator.

In the reproducible potential failure-causing event table 500, the values listed below are set, for example:

B1, which indicates out of paper;

B2, which indicates out of toner (replaced with an empty toner box);

B3, which indicates that the stacker is unloaded;

B4, which indicates that the print controller is restarted;

B5, which indicates that the printer power is turned off/on;

B6, which indicates a return from a power saving mode; and

B7, which indicates that printing is suspended.

In a case where any of these potential failure-causing events is detected, a corresponding one of the potential failure-causing event IDs is saved.

In the restoration process, if the potential failure-causing event ID is included in the reproducible potential failure-causing event table 500, information indicating that "reproduction of the potential failure-causing event is requested to an operator" is obtained as restoration method information 550. Therefore, in this case, the output control module 135 displays a reproduction process that corresponds to the potential failure-causing event ID on a display of the information processing apparatus 100 or the printer 170. After an operator has reproduced the potential failure-causing event, the operator gives an instruction indicating that reproduction is completed. After the instruction has been detected, the SS control module 140 gives the snapshot obtaining and restoration instruction 142 to the SS management module 120 and restores the state at the time when the potential failure-causing event occurred.

FIG. 6 is an explanatory diagram illustrating an example data structure of an irreproducible potential failure-causing event table 600.

The irreproducible potential failure-causing event table 600 has an ID field 610 and an operator-irreproducible potential failure-causing event field 620. The ID field 610 stores therein a potential failure-causing event ID. The operator-irreproducible potential failure-causing event field 620 stores therein a potential failure-causing event that is irreproducible by an operator.

In the irreproducible potential failure-causing event table 600, the values listed below are set, for example:

C1, which indicates a jam (a paper jam);

C2, which indicates a misfeed (for example, a sheet is conveyed obliquely);

C3, which indicates that the stacker is full (for example, output to the sheet output unit exceeds the limited amount);

C4, which indicates an abnormal fuser temperature;

C5, which indicates an error in the drum motor; and

C6, which indicates a power error.

In a case where any of these potential failure-causing events is detected, a corresponding one of the potential failure-causing event IDs is saved.

In the restoration process, if the potential failure-causing event ID is included in the irreproducible potential failure-causing event table 600, information indicating that "an instruction is given to the printer simulator 180 to reproduce the potential failure-causing event" is obtained as restoration method information 650. Therefore, in this case, the output control module 135 activates the printer simulator 180 and instructs the printer simulator 180 to perform a reproduction process that corresponds to the potential failure-causing event ID. After completion of the reproduction process by the printer simulator 180, the SS control module 140 gives the snapshot obtaining and restoration instruction 142 to the SS management module 120 and restores the state at the time when the potential failure-causing event occurred.

Figure 7:
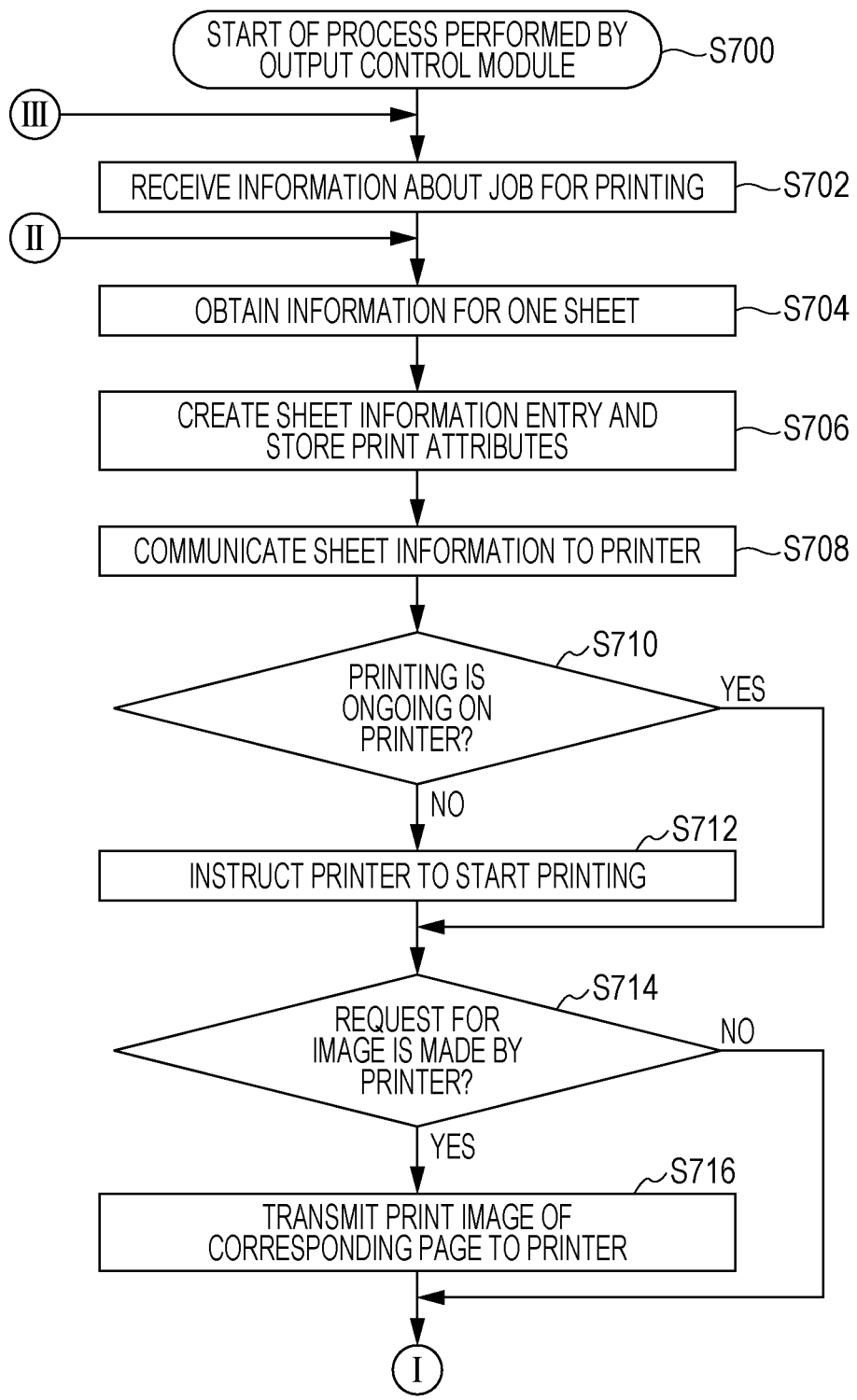
FIG. 7 is a flowchart illustrating an example process according to the exemplary embodiment.
Figure 8:
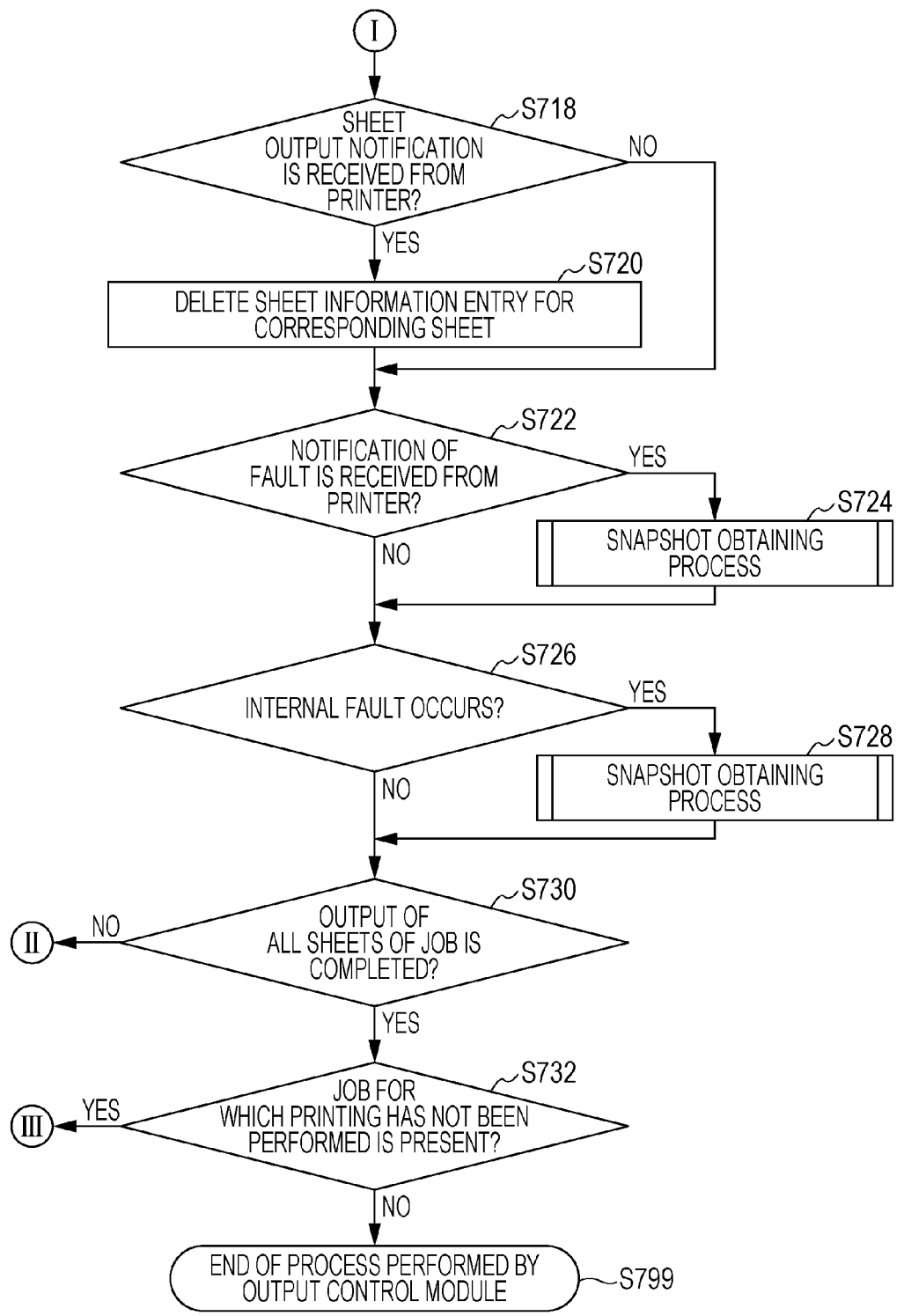
FIG. 8 is a flowchart illustrating an example process according to the exemplary embodiment.

FIGS. 7 and 8 are flowcharts illustrating an example process according to this exemplary embodiment (an example of a process of obtaining a snapshot at the time when a potential failure-causing event occurs).

In step S700, the process to be performed by the output control module 135 starts.

In step S702, the output control module 135 receives information about a job for which printing is performed.

In step S704, the output control module 135 obtains information for one sheet.

In step S706, the output control module 135 creates a sheet information entry and stores print attributes.

In step S708, the output control module 135 communicates the sheet information to the printer 170.

In step S710, the output control module 135 determines whether printing is ongoing on the printer 170. If printing is ongoing, the flow proceeds to step S714. Otherwise, the flow proceeds to step S712.

In step S712, the output control module 135 instructs the printer 170 to start printing.

In step S714, the output control module 135 determines whether a request for an image is made by the printer 170. If a request for an image is made, the flow proceeds to step S716. Otherwise, the flow proceeds to step S718.

In step S716, the output control module 135 transmits a print image of the corresponding page to the printer 170.

In step S718, the output control module 135 determines whether a sheet output notification is received from the printer 170. If a sheet output notification is received, the flow proceeds to step S720. Otherwise, the flow proceeds to step S722.

In step S720, the output control module 135 deletes the sheet information entry for the corresponding sheet.

In step S722, the output control module 135 determines whether a notification of a fault is received from the printer 170. If a notification of a fault is received, the flow proceeds to step S724. Otherwise, the flow proceeds to step S726.

In step S724, the output control module 135 performs a snapshot obtaining process.

In step S726, the output control module 135 determines whether an internal fault occurs. If an internal fault occurs, the flow proceeds to step S728. Otherwise, the flow proceeds to step S730.

In step S728, the output control module 135 performs the snapshot obtaining process. The process performed in steps S724 and S728 is described below with reference to the example flowchart illustrated in FIG. 9.

In step S730, the output control module 135 determines whether output of all sheets of the job is completed. If output of all sheets is completed, the flow proceeds to step S732. Otherwise, the flow returns to step S704.

In step S732, the output control module 135 determines whether a job for which printing has not been performed is present. If a job for which printing has not been performed is present, the flow returns to step S702. Otherwise, the process ends (step S799).

Figure 9:
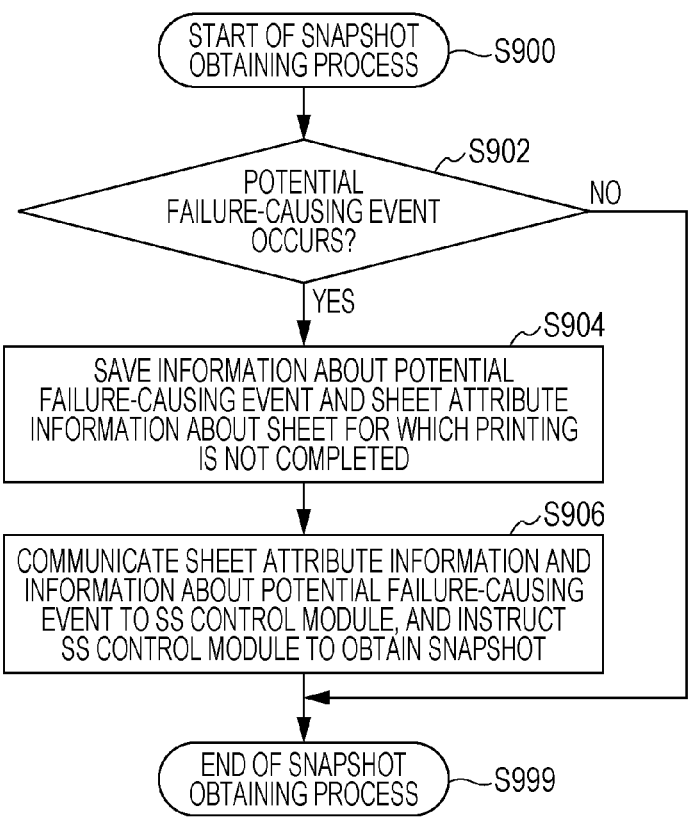
FIG. 9 is a flowchart illustrating an example process according to the exemplary embodiment.

FIG. 9 is a flowchart illustrating an example process according to this exemplary embodiment (the process performed in steps S724 and S728 in the example flowchart illustrated in FIG. 8).

In step S900, the output control module 135 starts the snapshot obtaining process.

In step S902, the output control module 135 determines whether a potential failure-causing event occurs. If a potential failure-causing event occurs, the flow proceeds to step S904. Otherwise, the process ends (step S999).

In step S904, the output control module 135 saves information about the potential failure-causing event and sheet attribute information about a sheet for which printing is not completed.

In step S906, the output control module 135 communicates the sheet attribute information and the information about the potential failure-causing event to the SS control module 140, and instructs the SS control module 140 to obtain a snapshot.

When the output control module 135 receives a print instruction and information for one sheet from the print controller 130, the output control module 135 creates a sheet information entry for the sheet, a sheet information entry being created for each sheet. A sheet information entry stores therein attributes of each sheet (a paper feed tray, an output tray, double-sided or single-sided printing, the type of finishing, and so on). The output control module 135 sends, on the basis of this information, sheet attribute information and a print start instruction to the printer 170 (performs the message transmission/reception 172).

When the printer 170 receives the print start instruction from the output control module 135, the printer 170 starts printing, feeds a sheet, transfers and fuses a page image to the sheet, and thereafter ejects the sheet to the output tray in accordance with the sheet attribute information described above.

When the printer 170 ejects the sheet to the output tray, the printer 170 communicates sheet output information to the output control module 135 (performs the message transmission/reception 172).

When the output control module 135 receives the sheet output information, the output control module 135 deletes the corresponding sheet information entry.

The output control module 135 performs the process described above on all sheets of the job.

Figure 10:
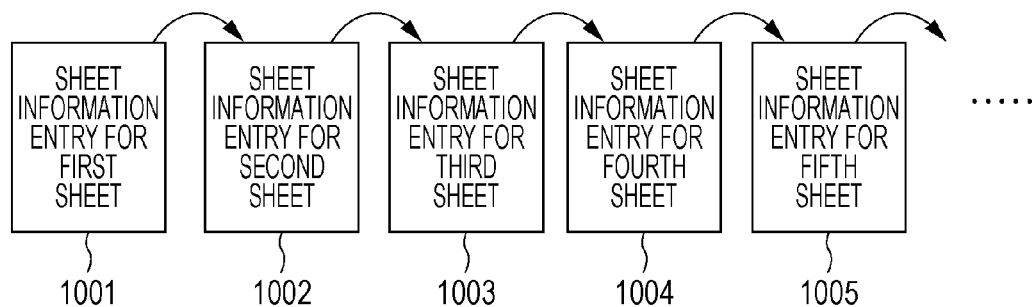
FIG. 10 is an explanatory diagram illustrating an example process according to the exemplary embodiment.

FIG. 10 is an explanatory diagram illustrating an example process according to this exemplary embodiment (an example process performed by the output control module 135 on sheet information entries).

Sheet information entries are created for respective sheets and are linked to each other as illustrated in the example in FIG. 10. That is, a sheet information entry 1001 for the first sheet is linked to a subsequent sheet information entry 1002 for the second sheet, the sheet information entry 1002 for the second sheet is linked to a subsequent sheet information entry 1003 for the third sheet, the sheet information entry 1003 for the third sheet is linked to a subsequent sheet information entry 1004 for the fourth sheet, the sheet information entry 1004 for the fourth sheet is linked to a subsequent sheet information entry 1005 for the fifth sheet, and so on.

Each entry stores therein information, such as a paper feed destination, an output destination, double-sided/single-sided printing, the order of output, the type of finishing, and so on. When a notification of output of a sheet is received from the printer 170, the corresponding sheet information entry is deleted.

When the output control module 135 receives a notification of a fault or a notification of a status from the printer 170 or when an internal fault occurs in the print controller 130, the output control module 135 determines whether the event matches any of the events included in the potential failure-causing event tables (the intra-controller potential failure-causing event table 400, the reproducible potential failure-causing event table 500, and the irreproducible potential failure-causing event table 600). If the event matches any of the events included in the potential failure-causing event tables, the output control module 135 saves information about the potential failure-causing event and information of the sheet information entry for a sheet for which printing is not completed, and sends an instruction for obtaining a snapshot to the SS control module 140 together with the pieces of information.

When the SS control module 140 receives the instruction for obtaining a snapshot from the output control module 135, the SS control module 140 obtains information about the current date and time (the current year, month, day, time, minute, second, millisecond, and so on, or any combination thereof) and creates a restoration information link that points the sheet information entry and the information about the potential failure-causing event received from the output control module 135. The name of the link created this time includes the date and time information. For example, the date and time information is added to the name of the link, and the link is named "CauseInfo_2015_0331_133030", for example.

Next, the SS control module 140 requests the SS management module 120 to obtain a snapshot (gives the snapshot obtaining and restoration instruction 142). At this time, the SS control module 140 specifies the above-described date and time information as the name of the snapshot so that the combination of the sheet information entry, the potential failure-causing event, and the snapshot is uniquely identifiable.

As the SS management module 120, VMware, Xen, Zone, or the like that is widely used and that is provided on a virtual OS may be used.

Figure 11:
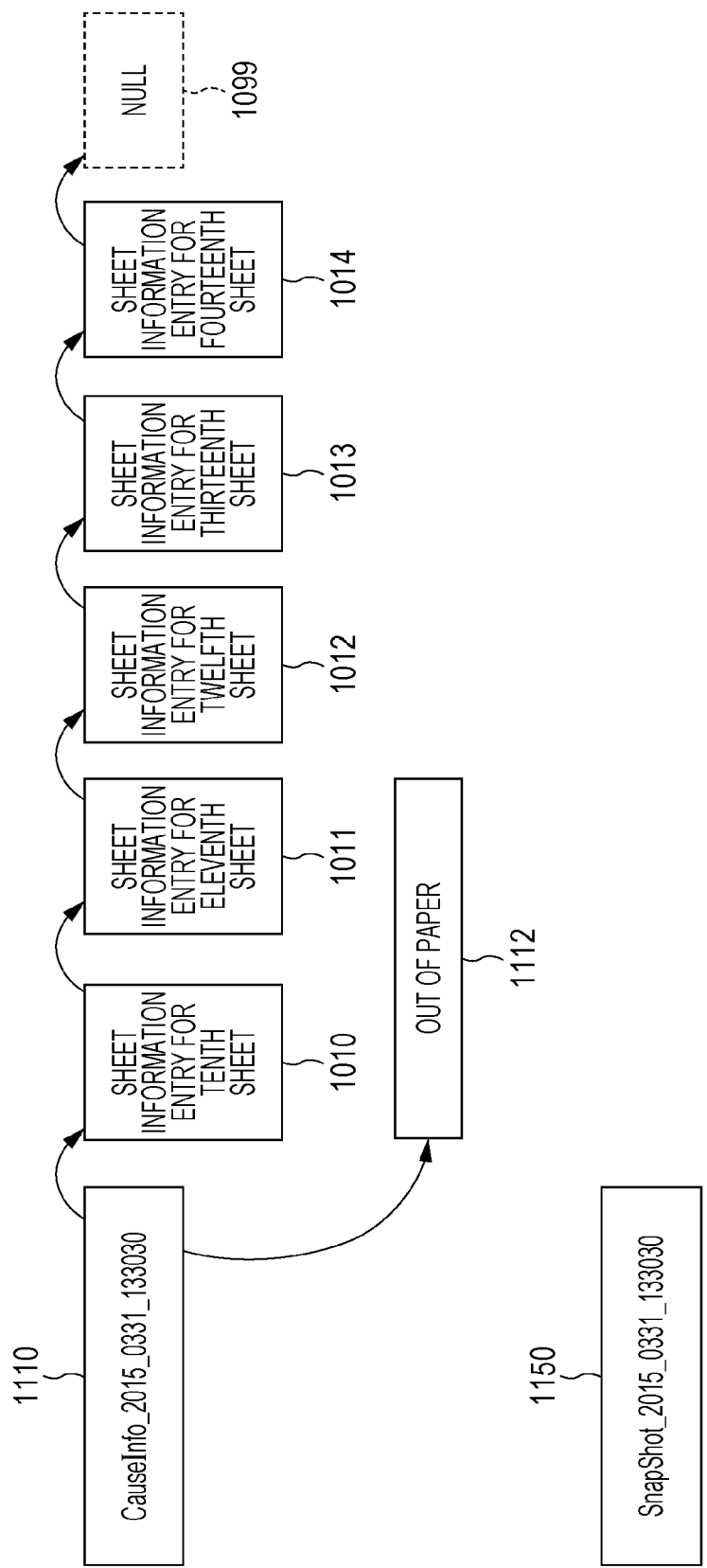
FIG. 11 is an explanatory diagram illustrating an example process according to the exemplary embodiment.

FIG. 11 is an explanatory diagram illustrating an example process according to this exemplary embodiment (an example process performed on a sheet information entry when a fault or the like occurs).

It is assumed that "out of paper" (a potential failure-causing event) occurs when a sheet information entry 1010 for the tenth sheet is being processed (that is, after the end of print processing on the ninth sheet). FIG. 11 illustrates an example of sheet information entries of interest, the potential failure-causing event, and a related restoration information link in a case where the sheets that have not been output in this state are the tenth to fourteenth sheets (the corresponding sheet information entries are the sheet information entry 1010 for the tenth sheet, a sheet information entry 1011 for the eleventh sheet, a sheet information entry 1012 for the twelfth sheet, a sheet information entry 1013 for the thirteenth sheet, and a sheet information entry 1014 for the fourteenth sheet). That is, a restoration information link 1110 that is named "CauseInfo_2015_0331_133030" and that has a link to the sheet information entry 1010 for the tenth sheet and a link to potential failure-causing event information 1112 "out of paper (potential failure-causing event)" is generated and saved.

By including in the file name the date and time when a snapshot 1150 was obtained, and naming the snapshot 1150 "SnapShot_2015_0331_133030", for example, the restoration information link 1110 "CauseInfo_2015_0331_133030" that corresponds to the snapshot is identifiable.

Figure 12:
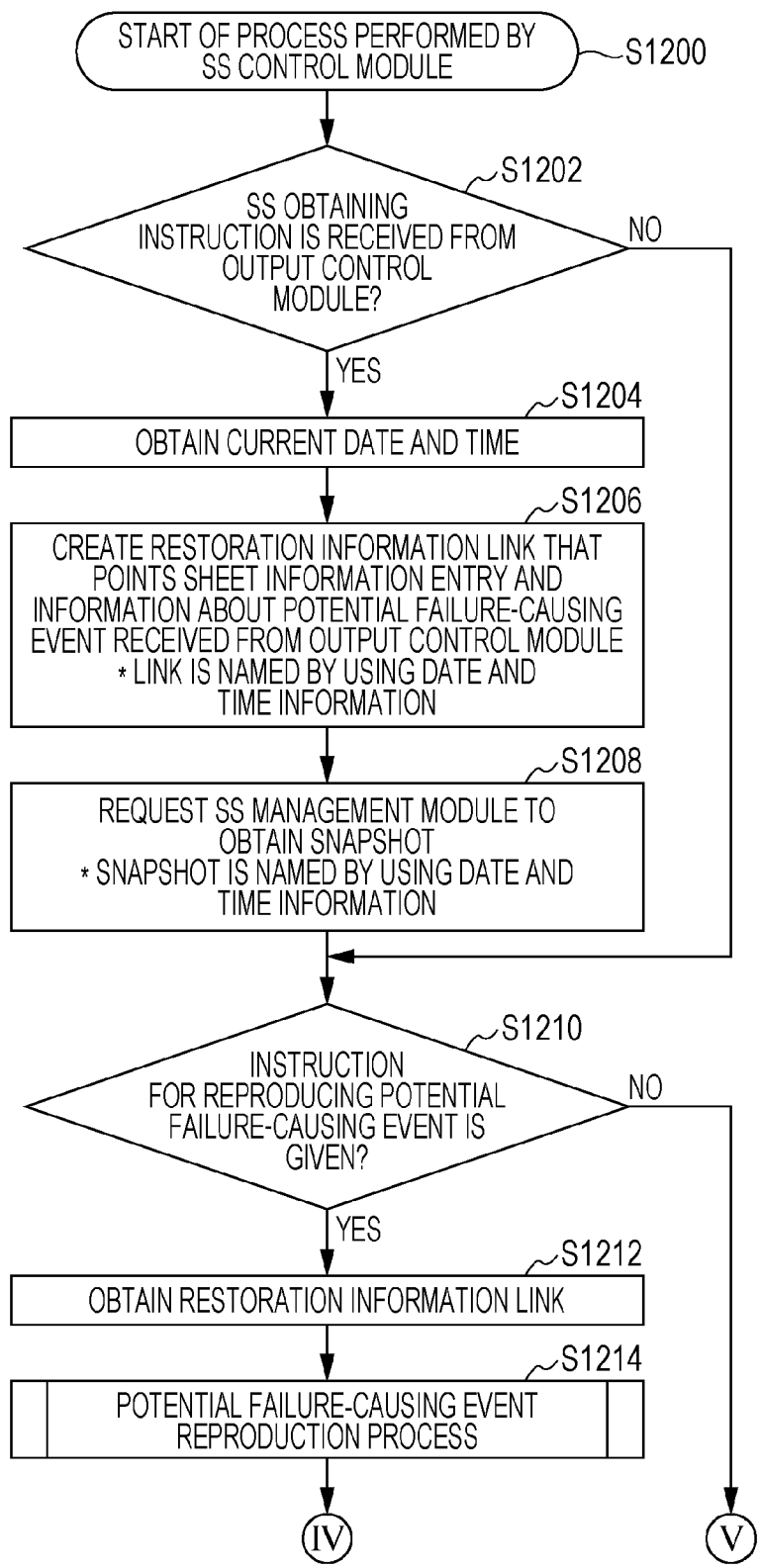
FIG. 12 is a flowchart illustrating an example process according to the exemplary embodiment.
Figure 13:
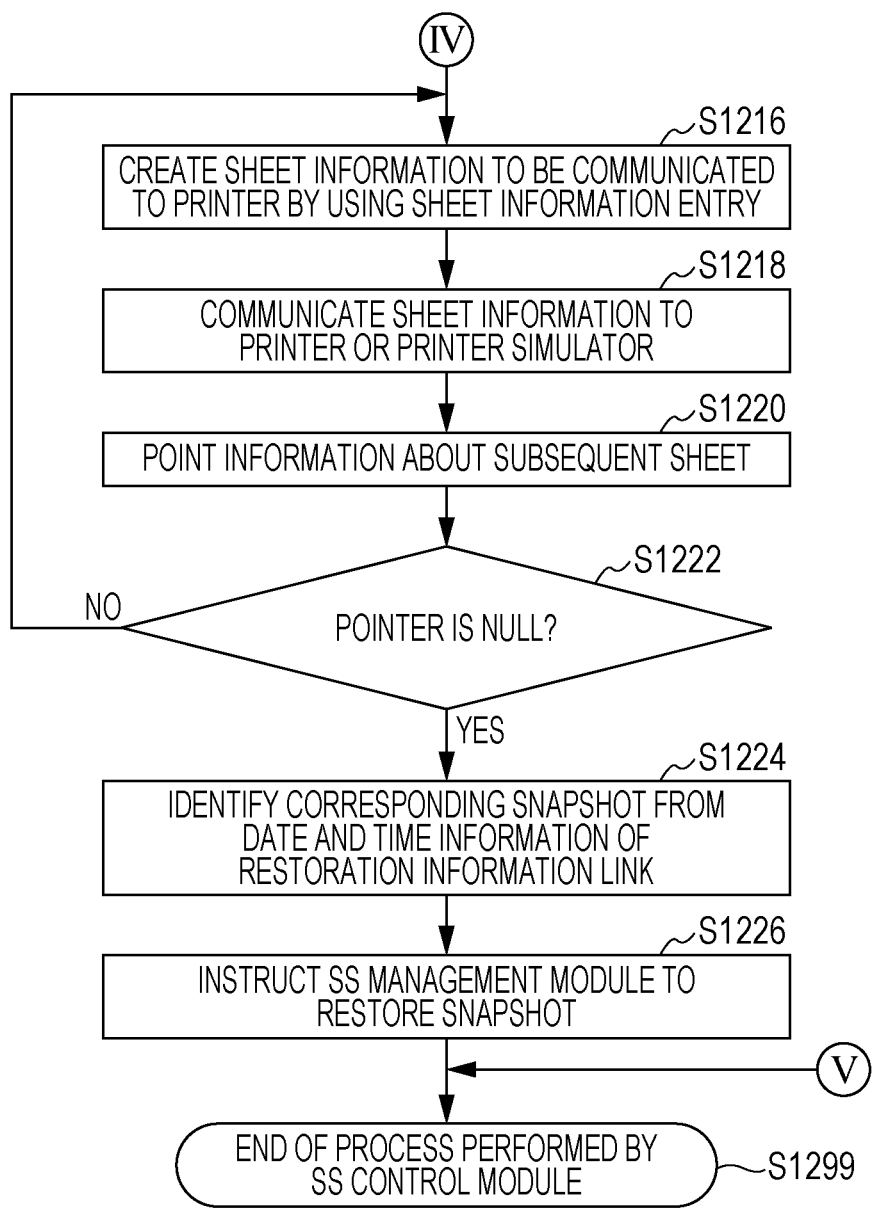
FIG. 13 is a flowchart illustrating an example process according to the exemplary embodiment.

FIGS. 12 and 13 are flowcharts illustrating an example process (performed by the SS control module 140) according to this exemplary embodiment.

In step S1200, the process to be performed by the SS control module 140 starts.

In step S1202, the SS control module 140 determines whether an SS obtaining instruction is received from the output control module 135. If an SS obtaining instruction is received, the flow proceeds to step S1204. Otherwise, the flow proceeds to step S1210.

In step S1204, the SS control module 140 obtains the current date and time.

In step S1206, the SS control module 140 creates a restoration information link that points the sheet information entry and the information about the potential failure-causing event received from the output control module 135. The link is named by using the date and time information.

In step S1208, the SS control module 140 requests the SS management module 120 to obtain a snapshot. The snapshot is named by using the date and time information.

In step S1210, the SS control module 140 determines whether an instruction for reproducing the potential failure-causing event is given. If an instruction for reproducing the potential failure-causing event is given, the flow proceeds to step S1212. Otherwise, the process ends (step S1299).

In step S1212, the SS control module 140 obtains the restoration information link.

In step S1214, the SS control module 140 performs a potential failure-causing event reproduction process. The process in step S1214 is described below with reference to the example flowchart illustrated in FIG. 14.

In step S1216, the SS control module 140 creates sheet information to be communicated to the printer 170 by using the sheet information entry.

In step S1218, the SS control module 140 communicates the sheet information to the printer 170 or the printer simulator 180.

In step S1220, the SS control module 140 points information about the subsequent sheet.

In step S1222, the SS control module 140 determines whether the pointer is null ("null" 1099 in FIG. 11, for example). If the pointer is null, the flow proceeds to step S1224. Otherwise, the flow returns to step S1216.

In step S1224, the SS control module 140 identifies a corresponding snapshot from the date and time information of the restoration information link.

In step S1226, the SS control module 140 instructs the SS management module 120 to restore the snapshot.

Figure 14:
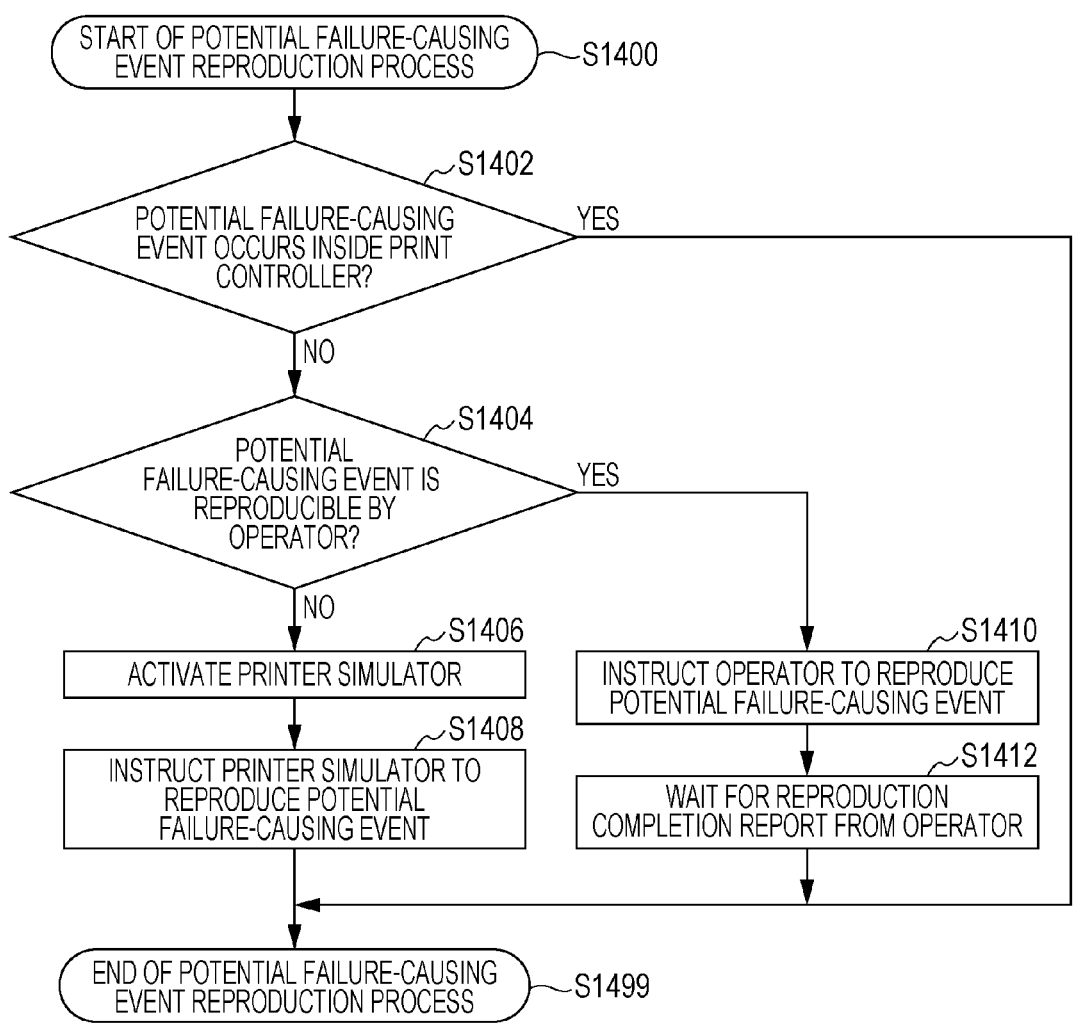
FIG. 14 is a flowchart illustrating an example process according to the exemplary embodiment.

FIG. 14 is a flowchart illustrating an example process according to this exemplary embodiment (the process in step S1214 in the example flowchart illustrated in FIG. 12).

In step S1400, the SS control module 140 starts the potential failure-causing event reproduction process.

In step S1402, the SS control module 140 determines whether the potential failure-causing event occurs inside the print controller 130. If the potential failure-causing event occurs inside the print controller 130, the process ends (step S1499). Otherwise, the flow proceeds to step S1404.

In step S1404, the SS control module 140 determines whether the potential failure-causing event is reproducible by an operator. If the potential failure-causing event is reproducible by an operator, the flow proceeds to step S1410. Otherwise, the flow proceeds to step S1406.

In step S1406, the SS control module 140 activates the printer simulator 180.

In step S1408, the SS control module 140 instructs the printer simulator 180 to reproduce the potential failure-causing event.

In step S1410, the SS control module 140 instructs an operator to reproduce the potential failure-causing event.

In step S1412, the SS control module 140 waits for a reproduction completion report from the operator.

Specifically, an example process for reproducing a failure from a snapshot is described.

In the usual operation, a snapshot and a restoration information link obtained by an information processing apparatus 100A of a customer are transmitted to a failure handling department, and the failure is reproduced by an information processing apparatus 100B of the failure handling department.

When the SS control module 140 receives a snapshot restoration instruction from an operator, the SS control module 140 obtains potential failure-causing event information by using the restoration information link. In the example in FIG. 10 described above, the restoration information link corresponds to the restoration information link 1110 "CauseInfo_2015_0331_133030", and the potential failure-causing event information corresponds to the potential failure-causing event information 1112 "out of paper (potential failure-causing event)".

The potential failure-causing event information is classified into three categories, namely, (1) a potential failure-causing event that occurs inside the print controller 130, (2) a potential failure-causing event that is reproducible by an operator, and (3) a potential failure-causing event that is irreproducible by an operator, and the method for reproducing the potential failure-causing event differs depending on the category (see the intra-controller potential failure-causing event table 400, the reproducible potential failure-causing event table 500, and the irreproducible potential failure-causing event table 600 respectively illustrated in the examples in FIGS. 4 to 6).

(1) A potential failure-causing event that occurs inside the print controller 130 (see FIG. 4)

In a case where the potential failure-causing event occurs inside the print controller 130, the state is completely restored by using the snapshot, and therefore, it is necessary that the SS control module 140 requests the SS management module 120 to restore the snapshot.

(2) A potential failure-causing event that is reproducible by an operator (see FIG. 5)

In a case where the potential failure-causing event is reproducible by an operator, the print controller 130 displays a message on a screen of the printer 170 or the like, for example, to request an operator to reproduce the potential failure-causing event. For example, in a case where the potential failure-causing event is the "out-of-paper" event, the operator is requested to empty the tray, for example.

When the operator completes reproduction of the potential failure-causing event, the operator sends a notification of completion to the SS control module 140 by making a response using a keyboard, a touch panel, or the like.

When the SS control module 140 receives from the operator the notification that reproduction of the potential failure-causing event is completed, the SS control module 140 requests the SS management module 120 to restore the snapshot (gives the snapshot obtaining and restoration instruction 142).

(3) A potential failure-causing event that is irreproducible by an operator (see FIG. 6)

In a case where the potential failure-causing event is irreproducible by an operator, the SS control module 140 activates the printer simulator 180, switches the connection to the printer 170, which is a physical apparatus, to the printer simulator 180, and instructs the printer simulator 180 to reproduce the potential failure-causing event occurred in the printer 170. It is assumed that the printer simulator 180 is a generally available simulator having a function of reproducing a fault that corresponds to a specified code.

Next, the SS control module 140 requests the SS management module 120 to restore the snapshot (gives the snapshot obtaining and restoration instruction 142).

As a result of the processes described above, the state at the time when the potential failure-causing event occurred is restored. Therefore, when printing is restarted thereafter, the failure is reproduced.

With the information processing apparatus 100, even for a failure for which the cause is not identifiable at the time point when the failure surfaces or for a failure, such as a disordered page, which is detected by an end user, it is possible to reproduce the failure and analyze the cause by restoring the state that causes the failure.

Figure 15:
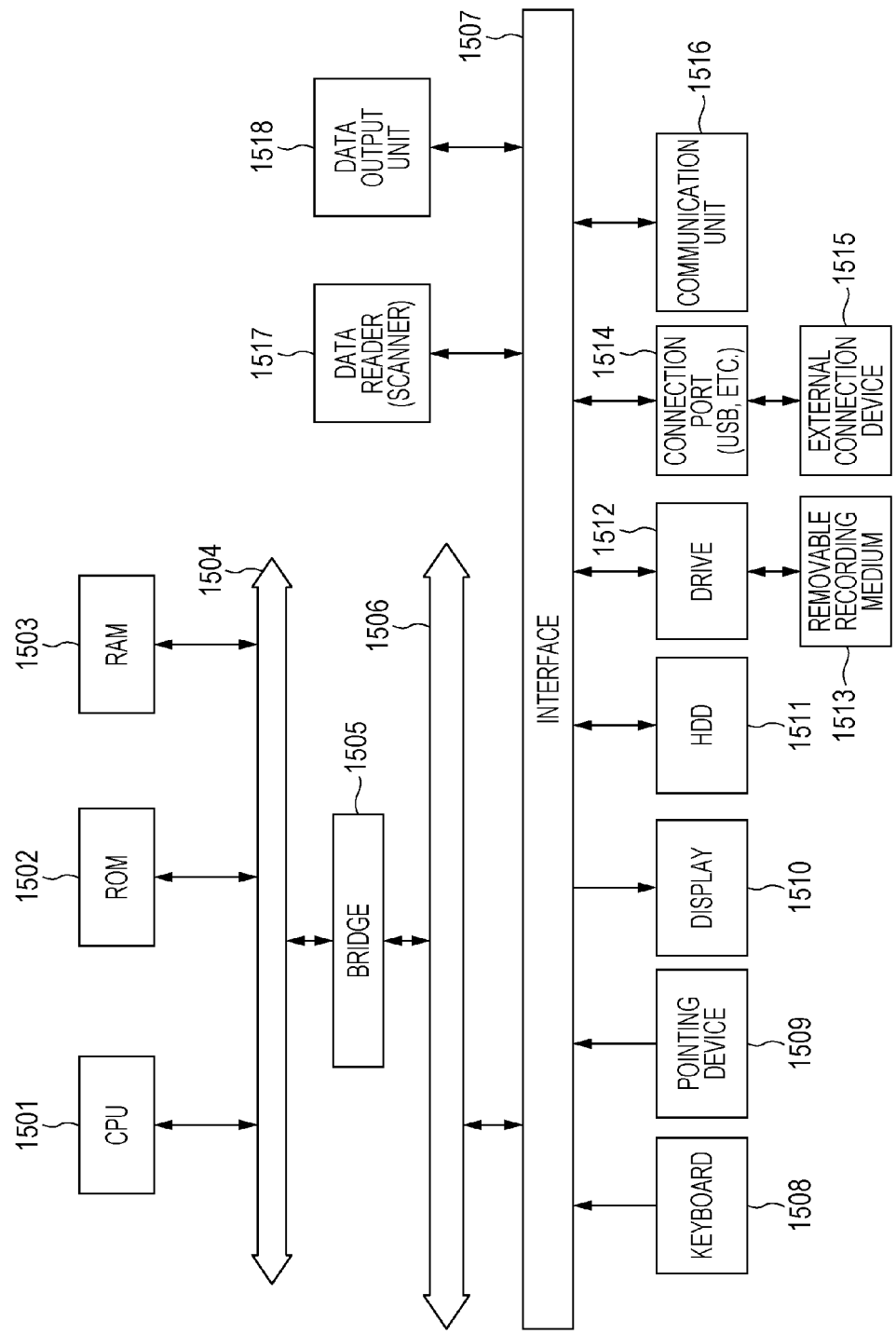
FIG. 15 is a block diagram illustrating an example hardware configuration of a computer for implementing the exemplary embodiment.

An example hardware configuration of the information processing apparatus 100 according to this exemplary embodiment is described with reference to FIG. 15. The configuration illustrated in FIG. 15 is implemented by using a personal computer (PC), for example. The configuration illustrated in FIG. 15 illustrates an example hardware configuration that includes a data reader 1517, which is a scanner or the like, and a data output unit 1518, which is a printer or the like.

A CPU 1501 is a controller that performs processes in accordance with a computer program in which a sequence of processes performed by the modules described in this exemplary embodiment, namely, the host OS 110, the virtual SW 115, the SS management module 120, the guest OS 125, the print controller 130, the output control module 135, the SS control module 140, and so on, is described.

A read-only memory (ROM) 1502 stores programs used by the CPU 1501, arithmetic parameters, and so on. A RAM 1503 stores programs used upon execution by the CPU 1501, parameters that vary as needed in the execution, and so on. The CPU 1501, the ROM 1502, and the RAM 1503 are connected to one another via a host bus 1504 that is constituted by a CPU bus or the like.

The host bus 1504 is connected to an external bus 1506, which is a Peripheral Component Interconnect/Interface (PCI) bus or the like, via a bridge 1505.

A keyboard 1508 and a pointing device 1509, such as a mouse, are input devices operated by an operator. A display 1510 is a liquid crystal display or a cathode ray tube (CRT) display, for example, and displays various types of information as text information or image information.

An HDD 1511 includes therein a hard disk (or may include a flash memory or the like), drives the hard disk, and records or reproduces a program executed by the CPU 1501 or information to/from the hard disk. The hard disk is used to implement the functions of the storage memory 190 or the like. The HDD 1511 further stores therein other various types of data, various computer programs, and so on.

A drive 1512 reads data or a program recorded in an attached removable recording medium 1513, such as a magnetic disk, an optical disc, a magneto-optical (MO) disc, or a semiconductor memory, and feeds the data or program to the RAM 1503 that is connected to the drive 1512 via an interface 1507, the external bus 1506, the bridge 1505, and the host bus 1504. The removable recording medium 1513 may also be used as a data recording area similarly to the hard disk.

A connection port 1514 is a port for connecting an external connection device 1515 and includes a connection unit based on Universal Serial Bus (USB), IEEE 1394, or the like. The connection port 1514 is connected to the CPU 1501 and so on via the interface 1507, the external bus 1506, the bridge 1505, the host bus 1504, and so on. A communication unit 1516 is connected to a communication line and performs external data communication processing. The data reader 1517 is a scanner, for example, and performs a process of reading a document. The data output unit 1518 is a printer, for example, and performs a process of outputting document data.

Note that the hardware configuration of the information processing apparatus 100 illustrated in FIG. 15 is one example configuration. This exemplary embodiment is not limited to the configuration illustrated in FIG. 15 and may employ a configuration which enables implementation of the modules described in this exemplary embodiment. For example, some of the modules may be configured by using a dedicated hardware unit (for example, an application-specific integrated circuit (ASIC)), or some of the modules may reside in an external system and may be connected via a communication line. Alternatively, the system illustrated in FIG. 15 may be provided in plurality, and the plural systems may be connected to one another via communication lines and operate cooperatively with one another. Specifically, the system may be built in a PC, a portable information communication device (a portable phone, a smartphone, a mobile device, a wearable computer, or the like), a home information appliance, a robot, a copy machine, a facsimile machine, a scanner, a printer, a multifunction machine (an image processing apparatus having two or more functions among the functions provided by a scanner, a printer, a copy machine, a facsimile machine, and so on), or the like.

The program described above may be stored in a recording medium and provided from the recording medium, or may be provided via a communication system. In this case, the program described above may be regarded as a "computer readable recording medium storing the program".

A "computer-readable recording medium storing the program" is a computer-readable recording medium that is used to install, execute, and distribute the program, for example, and that records the program therein.

Examples of the recording medium include a digital versatile disk (DVD) that is based on the standards developed by DVD Forum, such as a DVD-R, a DVD-RW, or a DVD-RAM, a DVD that is based on the standards developed by DVD+RW Alliance, such as a DVD+R or a DVD+RW, a compact disc (CD), such as a compact disc read-only memory (CD-ROM), a CD-Recordable (CD-R), or a CD-Rewritable (CD-RW), a Blu-ray (registered trademark) disc, an MO disc, a flexible disk (FD), a magnetic tape, a hard disk, a ROM, an electrically erasable, programmable read-only memory (EEPROM (registered trademark)), a flash memory, a RAM, a Secure Digital (SD) memory card, and so on.

The above-described program or part thereof may be recorded and saved in the recording medium or may be recorded in the recording medium for distribution, for example. The above-described program or part thereof may be transmitted via a wired network or a wireless communication network used for a local area network (LAN), a metropolitan area network (MAN), a wide area network (WAN), the Internet, an intranet, an extranet, and so on or via a transmission medium that is a combination thereof, or may be superimposed on a carrier wave and carried.

The above-described program may constitute part of another program or may be recorded to a recording medium together with another program. The above-described program may be divided into pieces, which are recorded to plural recording media. The above-described program may be recorded in any form as long as the program is restorable. For example, the program may be compressed or encrypted, and recorded.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A virtual computer system comprising:
a central processing unit (CPU) configured to act as:
a potential failure-causing event detection controller that detects a potential failure-causing event relating to a printer provided external to a virtual computer having installed thereon a guest operating system on which an application program is installed or relating to control of the printer;
a saving unit that performs a saving process of saving information indicating the potential failure-causing event and information about a page for which printing is not completed by the printer;
a snapshot creation unit that creates a snapshot of the guest operating system including the application program after the saving unit has performed the saving process; and
a reproduction unit that, when an instruction for reproducing a failure caused by the potential failure-causing event is given to the virtual computer, performs a different reproduction process for reproducing the failure depending on whether the potential failure-causing event relates to an inside of a controller controlling the printer, is reproducible by an operator, or is irreproducible by an operator.

2. The virtual computer system according to claim 1, wherein
the potential failure-causing event detection controller detects a potential failure-causing event that relates to an inside of a controller controlling the printer, a potential failure-causing event that is reproducible by an operator, and a potential failure-causing event that is irreproducible by an operator.

3. The virtual computer system according to claim 1, wherein the CPU is further configured to act as:
an accepting unit that accepts the information saved by the saving unit and the snapshot created by the snapshot creation unit; and
a restoration controller that performs a control process to restore the snapshot.

4. The virtual computer system according to claim 3, wherein
when the information indicating the potential failure-causing event is information about a failure that relates to the inside of the controller controlling the printer, the reproduction unit makes the restoration controller perform the control process.

5. The virtual computer system according to claim 4, wherein
when the information indicating the potential failure-causing event is information about a failure that is reproducible by an operator, the reproduction unit shows a message for requesting an operator to perform reproduction, and after receiving an instruction indicating completion of reproduction from the operator, makes the restoration controller perform the control process.

6. The virtual computer system according to claim 5, wherein
when the information indicating the potential failure-causing event is information about a failure that is irreproducible by an operator, the reproduction unit instructs a printer simulator to reproduce the potential failure-causing event in the printer and makes the restoration controller perform the control process.

7. The virtual computer system according to claim 4, wherein
when the information indicating the potential failure-causing event is information about a failure that is irreproducible by an operator, the reproduction unit instructs a printer simulator to reproduce the potential failure-causing event in the printer and makes the restoration controller perform the control process.

8. The virtual computer system according to claim 3, wherein
when the information indicating the potential failure-causing event is information about a failure that is reproducible by an operator, the reproduction unit shows a message for requesting an operator to perform reproduction, and after receiving an instruction indicating completion of reproduction from the operator, makes the restoration controller perform the control process.

9. The virtual computer system according to claim 8, wherein
when the information indicating the potential failure-causing event is information about a failure that is irreproducible by an operator, the reproduction unit instructs a printer simulator to reproduce the potential failure-causing event in the printer and makes the restoration controller perform the control process.

10. The virtual computer system according to claim 3, wherein
when the information indicating the potential failure-causing event is information about a failure that is irreproducible by an operator, the reproduction unit instructs a printer simulator to reproduce the potential failure-causing event in the printer and makes the restoration controller perform the control process.

11. A non-transitory computer readable medium storing a virtual computer program causing a computer to execute a process, the process comprising:
detecting a potential failure-causing event relating to a printer provided external to a virtual computer having installed thereon a guest operating system on which an application program is installed or relating to control of the printer;
performing a saving process of saving information indicating the potential failure-causing event and information about a page for which printing is not completed by the printer;
creating a snapshot of the guest operating system including the application program after the saving process has been performed; and
performing, when an instruction for reproducing a failure caused by the potential failure-causing event is given to the virtual computer, a different reproduction process for reproducing the failure depending on whether the potential failure-causing event relates to an inside of a controller controlling the printer, is reproducible by an operator, or is irreproducible by an operator.

12. The non-transitory computer readable medium according to claim 11, the process further comprising:
accepting the information that has been saved and the snapshot that has been created; and
performing a control process to restore the snapshot.

13. A method for a virtual computer system, the method comprising:
detecting a potential failure-causing event relating to a printer provided external to a virtual computer having installed thereon a guest operating system on which an application program is installed or relating to control of the printer;
performing a saving process of saving information indicating the potential failure-causing event and information about a page for which printing is not completed by the printer;
creating a snapshot of the guest operating system including the application program after the saving process has been performed; and
performing, when an instruction for reproducing a failure caused by the potential failure-causing event is given to the virtual computer, a different reproduction process for reproducing the failure depending on whether the potential failure-causing event relates to an inside of a controller controlling the printer, is reproducible by an operator, or is irreproducible by an operator.

* * * * *